Aug. 6, 1935.  A. P. FERGUESON ET AL  2,010,072
BACK BAR SHIELD
Filed March 20, 1933
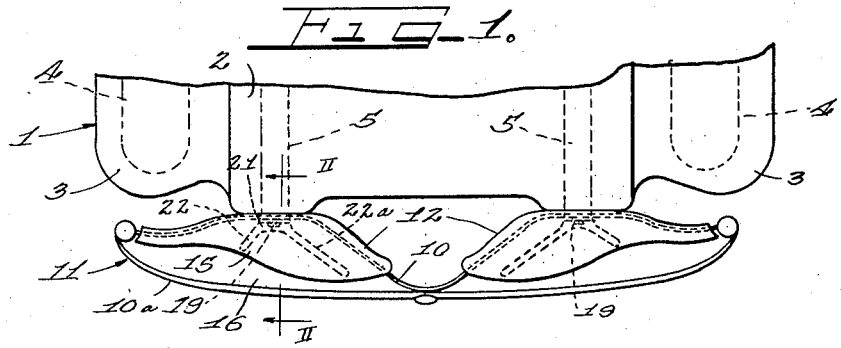
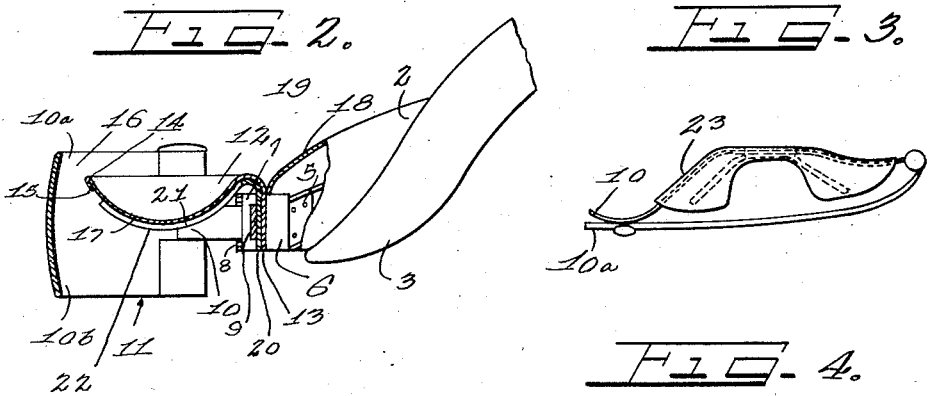
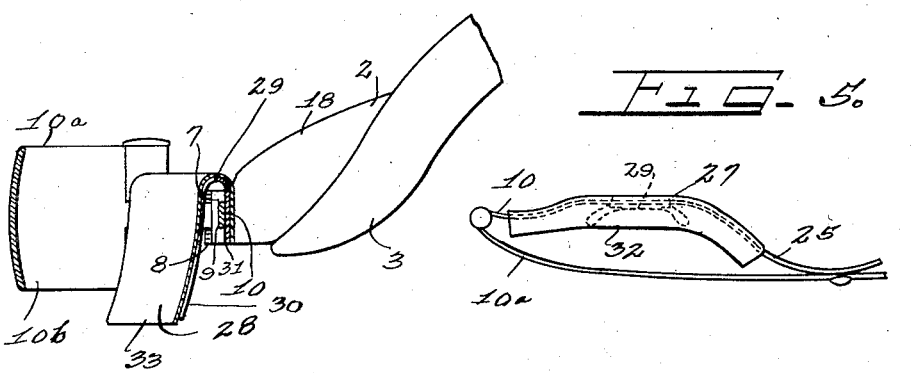
Inventors
ARTHUR P. FERGUESON,
BLADEN M. SHORT.

Patented Aug. 6, 1935

2,010,072

UNITED STATES PATENT OFFICE 2,010,072

BACK BAR SHIELD

Arthur P. Fergueson and Bladen M. Short, Detroit, Mich., assignors to General Spring Bumper Corporation, Detroit, Mich., a corporation of Michigan Application March 20, 1933, Serial No. 661,754

6 Claims. (Cl. 293—55)

This invention has to do with automobile bumpers and particularly with means for improving the appearance of bumpers and for protecting the rear of the automobile body from gravel and the like thrown against the rear bumper by the tires.

Bumper impact bars are almost universally chrome-plated or otherwise brightly finished and are made in a variety of designs intended to enhance the appearance of the automobiles on which they are mounted. In the desire to create designs of impact bars to carry out stream-line and other effects, no attention appears to have been paid to the back bars of bumpers. These bars are usually painted a dull black or other inconspicuous color and detract materially from the appearance of cars.

Another part of automobiles which has been neglected not only from the standpoint of appearance of the car as a whole but also of protection from marring of finish is the rear part of the body. When it is considered that the rear part of a car is probably subject to more prolonged scrutiny, especially from autoists, than the front of the car, the need for improving the appearance of the back part of the body and the rear bumper cannot be denied.

It is accordingly an object of the invention to provide an ornamental shield for the back bar of a bumper to improve the appearance of the bumper as a whole, both front and rear.

It is another object of the invention to provide means for protecting the finish of the rear of a car body from injury due to gravel or the like thrown up by the wheels of the car.

Another object of the invention resides in the provision of a combined gravel deflector and bumper back bar shield for an automobile.

It is a further object to provide a shield and protector of the character referred to which may be mounted without requiring any reorganization of the mounting for the bumper.

It is still another object to provide a shield of this character of light metal having any desired shape and an outer or upper surface which may be colored to harmonize with the color scheme of the adjacent body finish or may be chrome-finished or be of polished rustless steel to harmonize with the bumper impact bar finish.

In carrying out the invention into practice, the shielding means is preferably formed in two sections, each with a depending arm arranged to be bolted with the back bar to the chassis frame horns. Each section is substantially coextensive with one-half of the back bar and overlies the same to conceal it, and extends toward the impact bar. The shield sections, when used also as body protectors, are disposed between the vertical planes of the impact bar and rear of the body adjacent the rear wheels and, in one form, prevent gravel and the like thrown up by the wheels and deflected forwardly by the forward face of the impact bar from reaching the body finish. In another form, the shields are struck directly by the gravel and the like and deflect the same away from the body finish.

Reinforcing members for the shields are preferably secured by the same means employed in mounting the back bar and shields, and are arranged in supporting relation to the freely extending or cantilever portions of the shields. The latter, being subject to light stresses, may be made of thin sheet material and aided in retaining their shape by the reinforcing members.

Other and further important objects of this invention will be apparent from the discloures in the specification and the accompanying drawing.

This invention (in preferred forms) is illustrated in the drawing and hereinafter more fully described.

On the drawing:

Figure 1 is a fragmentary plan view of an automobile equipped with a bumper and back bar shield embodying the invention.

Figure 2 is an enlarged cross-sectional view taken in a vertical plane designated by the line II—II in Figure 1, with the automobile body in elevation.

Figures 3, 4 and 5 are fragmentary plan views of further modified forms of back shield.

Figure 6 is a view similar to Figure 2 but of a modified form of back bar shield.

Referring now more particularly to the drawing, the rear of the vehicle body is shown fragmentarily at 1, including the body proper 2 and rear fenders 3 concealing the rear wheel tires as shown in dotted lines at 4. The chassis frame horns 5 extending at the rear of the car carry mounting blocks 6 to which the supporting bar of a bumper is to be securely attached. The bumper attaching means also preferably includes a clamp member 7 supplied with bolts 8 and formed with a cutout 9 of a shape conforming to the cross-sectional shape of the supporting or back bar 10 of the bumper 11. Thus in a car embodying simply a rear bumper, the bumper is attached directly to the mounting blocks 6 of the frame horns 5 by means of the clamp member 7 and associated bolts 8 or the like.

In the practice of the present invention, it is not necessary to in any way change or modify existing bumper constructions or the means by which the bumpers are attached to the chassis frame. In accordance with one form of the invention, the back bar shield and gravel deflecting device is shown in Figures 1 and 2 as comprising plate-like stampings 12 together substantially shielding or concealing the back bar 10 and preferably overlying a substantial portion of the space between the back bar 10 and the impact bar 10a of the bumper 11. In this form of the invention, the stamping 12 extends generally horizontally and is preferably provided in juxtaposition to the rear ends of the chassis frame horns with downwardly extending attaching arms 13, so that when the shield is attached in operative position as shown, said portions 13 are positioned substantially against the mounting blocks 6. For the purpose of rigidity as well as to provide a smooth edge, the marginal portions 14 of the shields 12 are return bent at 15, the same being spaced at 16 from the impact bar 10a sufficiently to obviate any likelihood of interference with the flexing of the impact bar in the function of the same when it receives a bump.

The shields preferably extend laterally to substantially the planes of the rear tires 4, although if desired they may be disposed entirely within the space between the planes of the tires 4. It will be observed that the shields 12 are dished at 17 adjacent the body proper of the car 1 to provide a contour which is substantially a continuation of the contour of the body at 18, thereby enhancing the appearance of the rear part of the car. The shields 12 are moreover so arranged that gravel and the like thrown upwardly against the forward surface 10b of the impact bar 10a and deflected by said forward surface 10b toward the rear part of the body of the car impinge upon the under surfaces of the shields 12 which perform the function of baffle plates in preventing the gravel and the like from reaching the finish of the body. The finish of the body at the rear of the car is therefore adequately protected from injury due to such gravel and the like.

It will be appreciated that while the shields 12 are shown as employed in conjunction with a bumper comprising a single impact bar and a single back bar, it is well within the province of the invention to employ the shields in conjunction with a bumper of any desired construction whether embodying one or a plurality of bars extending substantially throughout the width of the car, or one or a plurality of bumperette constructions. Moreover, while Figure 1 illustrates a pair of shields, it is to be understood that a single shield substantially coextensive with the two shields 12 could, if desired, be employed. It will be noted, moreover, that the shields are mounted independently of the back bar so that they are applicable to any car equipped with a bumper without requiring any reorganization of bumper mounting devices whatever. Of course it is to be understood that the invention is not limited to the particular manner of mounting the shields, and in fact any desired mode of mounting the same may be employed, whether it includes the means for mounting the backbar or some other means.

The material of which the shields 12 are constructed is preferably of the character of sheet-metal stampings formed into the desired shapes and capable of withstanding impacts of gravel and the like as above described without deformation or injury thereto. It may be desirable to reinforce the shields, especially those portions which are supported in substantially cantilever fashion. To this end, suitable reinforcing brackets 19 are provided. The brackets may assume any desired shape and arrangement, and are shown herein for illustrative purposes only as comprising substantially angular members arranged to substantially nest with the shields 12. The leg 20 of each bracket 19 fits between the securing or clamping block 7 and the leg 13 of the associated shield 12 and is secured by the bolt means 8. The other leg 21 of each bracket 19 extends away from the leg 20 and is preferably formed with a plurality of divergent arms 22 and 22a which engage and assist in supporting the cantilever portions of the associated shield 12. It will be understood that the means described herein for securing the reinforcing brackets in position may be varied as desired, the means particularly described herein being perhaps best since no reorganization of existing bumper mountings is required.

If desired, however, the attaching portions of the shields 12 and reinforcing brackets 19, instead of being bolted in position, may be riveted or welded to the chassis frame. Said shields and reinforcing brackets would thus be permanently secured to the frame and would always be in place when the bumper is mounted in position.

Stones, gravel and the like are also thrown up and rearwardly by the front wheels and, due to the speed of the car, are ordinarily in full flight when the rear wheels have advanced as far as the objects thus thrown, and strike the rear bumper. Such objects, due to their spread because of the time elapsing before striking the rear bumper, for the most part strike the bumper inwardly of the portion of the bumper struck by the objects thrown up by the rear wheels, and closer to the center of the bumper. To prevent such objects thrown up by the front wheels from impinging on the vehicle body at the rear end and injuring its finish, the shields have portions arranged for a substantial distance toward the center of the bumper as shown. Thus the deflector portions conceal substantially the entire length of the back bar and at the same time are effective substantially throughout their lengths in protecting the finish of the rear of the car body.

It may be desired to vary the outline of the deflectors to obtain different effects from an appearance standpoint, one such design being shown in Figure 3 at 23. This design of shield is applicable to and conforms generally with the outline of the back bar 10.

For different shapes of back bars 24 and 25, obviously the design of the shields 26 and 27 may be correspondingly modified as shown in Figures 4 and 5.

Instead of extending in a generally horizontal plane as shown in Figure 2, thereby serving to prevent objects thrown up by the wheels and deflected by the forward face 10b of the impact bar 10a from reaching the finish of the rear part of the automobile, the extending part of the shield may project downwardly as shown at 28 in Figure 6 to thereby perform the function of a baffle plate in intercepting the objects thrown up by the wheels and preventing the same from striking the front surface of the impact bar 10a. The shields 28 are preferably shaped and arranged to conceal substantially the entire length or at least a major portion of the length of the back bar 10 and if desired, may be provided with a reinforcing bracket 29 nesting within the same and having its arms 30 extending downwardly preferably in engagement with the forward face of the shield portion extending downwardly. The shield 28 and associated bracket are preferably secured in position in much the same manner in which the above-described forms of the invention are secured. However, these parts, as referred to above in connection with the other forms of the invention, may be riveted, welded or otherwise permanently secured to the chassis frame if such a method of securing the same be found desirable.

The stamping metal of which the various shields herein described are preferably made is preferably capable of flexure to some extent so that breakage or injury such as deformation due to impacts or other stresses to which the same may be subjected in use will be obviated. The mounting blocks 6 and clamping members 7 and associated parts are also preferably of metal, although if desired, other suitable material may be employed.

It is evident from the foregoing that the shields constructed and arranged in accordance with the principles of the present invention may be mounted on or secured to the frame independently of the bumper, although the same bolts may be conveniently used to secure the bumper support or back bar also.

The form of the invention shown in Figure 6 may be embodied in various designs, two of which are shown in Figures 4 and 5, wherein the lower edge of the baffle portions appears respectively at 31 and 32 corresponding with the lower edge 33 of the shield 28.

We are aware that many changes may be made and numerous details of construction may be varied through a wide range without departing from the principles of this invention, and we, therefore, do not purpose limiting the patent granted hereon, otherwise than necessitated by the prior art.

We claim as our invention:

1. In a motor vehicle including a bumper having portions thereof disposed adjacent and rearwardly of the rear wheels and including a back bar mounted on the motor vehicle frame; a shield concealing substantially the entire back bar portion from each end thereof to substantially the center thereof, and constituting substantially a continuation of the motor vehicle body, said shield being arranged to receive objects thrown up by the front and rear vehicle wheels on its undersurface to thereby protect the finish of the vehicle body against injury by such objects.

2. In a motor vehicle construction embodying a bumper having impact and back bars, means disposed over, so as to shield, a major part of the back bar, said means being located between the vehicle body and the impact bar and including a portion extending toward the impact bar from the body, said means being arranged entirely between the horizontal planes of the upper and lower limits of the impact bar, whereby said impact bar serves to protect said means from injury from colliding bumpers and other objects, said portion forming substantially a continuation of the adjacent end of the body to enhance the appearance of said end of the body.

3. In a motor vehicle including rear wheels, a rear frame construction and a rear bumper; shield means for preventing gravel and the like thrown up by the wheels from being deflected by the bumper onto the outer finish of the body of the vehicle, said means being disposed back of and entirely between the horizontal planes of the upper and lower limits of the bumper so as to be protected thereby from colliding bumpers and other objects, and being supported by said frame construction as a cantilever extending rearwardly from the frame construction.

4. In a motor vehicle including rear wheels, a rear frame construction and a rear bumper; shield means for preventing gravel and the like thrown up by the wheels from being deflected by the bumper onto the outer finish of the body of the vehicle, said means being disposed back of and entirely between the horizontal planes of the upper and lower limits of the bumper so as to be protected thereby from colliding bumpers and other objects, and being supported by said frame construction as a cantilever extending rearwardly from the frame construction, and means for reinforcing the portion of the first means thus extending from the frame construction.

5. In a motor vehicle including a vehicle body and wheels and a bumper having portions thereof disposed adjacent and rearwardly of the rear wheels, the bumper including an impact bar and also a back bar mounted on the motor vehicle frame, a shield mounted on the vehicle independently of the impact and back bars of the bumper, and spaced from the impact bar so as not to interfere with flexure of the impact bar, said shield extending over, so as to conceal from above, substantially the entire back bar from each end thereof to substantially the center thereof, and constituting substantially a continuation of the motor vehicle body.

6. In a motor vehicle construction including a vehicle body and a bumper having impact and back bars, means extending over, so as to shield, a major part of the back bar, said means being mounted on the vehicle body independently of said bars and located between the vehicle body and the impact bar, and including a portion extending toward the impact bar from the body, said means being arranged entirely between the horizontal planes of the upper and lower portions of the impact bar, whereby said impact bar serves to protect said means from injury from colliding bumpers and other objects.

ARTHUR P. FERGUESON.
BLADEN M. SHORT.